US012784155B2

(12) United States Patent
Kim et al.

(10) Patent No.: US 12,784,155 B2
(45) Date of Patent: Nov. 3, 2026

(54) METHOD AND APPARATUS WITH IMAGE PROCESSING BASED ON NEURAL DIFFUSION

(71) Applicant: Samsung Electronics Co., Ltd., Suwon-si (KR)

(72) Inventors: Seongeun Kim, Suwon-si (KR); Seohyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 18/660,030

(22) Filed: May 9, 2024

(65) Prior Publication Data

US 2025/0095117 A1 Mar. 20, 2025

(30) Foreign Application Priority Data

Sep. 20, 2023 (KR) ........................ 10-2023-0125532

(51) Int. Cl.
*G06T 5/70* (2024.01)
*G06T 5/60* (2024.01)
*G06V 10/40* (2022.01)

(52) U.S. Cl.
CPC .................. *G06T 5/70* (2024.01); *G06T 5/60* (2024.01); *G06V 10/40* (2022.01); *G06T 2207/20084* (2013.01)

(58) Field of Classification Search
None
See application file for complete search history.

(56) References Cited

U.S. PATENT DOCUMENTS

2006/0147109 A1* 7/2006 Munsil ................. H04N 1/4053 382/162
2007/0058866 A1* 3/2007 Boyce .................. H04N 19/176 375/E7.19
2007/0075924 A1* 4/2007 Momose ................... G06T 7/13 345/60

(Continued)

FOREIGN PATENT DOCUMENTS

CN 113850741 A * 12/2021 ............. G06N 3/045
CN 116563138 A * 8/2023 ............... G06T 5/70

OTHER PUBLICATIONS

Jonathan Ho et al., Denoising Diffusion Probabilistic Models, 2020, arXiv:2006.11239v2 [cs.LG] Dec. 16, 2020. pp. 1-25, furnished via IDS.*

(Continued)

*Primary Examiner* — Guillermo M Rivera-Martinez
(74) *Attorney, Agent, or Firm* — NSIP Law

(57) ABSTRACT

A method and apparatus with image processing based on neural diffusion are provided. The method includes: setting a randomness level for a target object; generating a noised image by performing a diffusion process of generating noise images while repeatedly performing noising based on a guide image of a guide domain including the target object and by extracting and saving, based on the randomness level, a partial preservation area from a noise image among the noise images; and obtaining a denoised output image of a target domain by performing a reverse process of repeatedly generating, based on the noised image, denoise images corresponding to the noise images and by applying the saved partial preservation area to a denoise image among the denoise images.

20 Claims, 11 Drawing Sheets

(56) References Cited

U.S. PATENT DOCUMENTS

| | | | | |
|---|---|---|---|---|
| 2009/0251736 | A1* | 10/2009 | Kawamura | H04N 1/4052 358/3.03 |
| 2016/0253787 | A1* | 9/2016 | Chen | G06T 5/70 382/275 |
| 2020/0242774 | A1 | 7/2020 | Park et al. | |
| 2022/0284232 | A1* | 9/2022 | Yin | G06V 30/194 |
| 2023/0051749 | A1 | 2/2023 | Li et al. | |
| 2023/0053588 | A1 | 2/2023 | Li et al. | |
| 2023/0095092 | A1* | 3/2023 | Xiao | G06T 5/70 382/254 |
| 2023/0153949 | A1* | 5/2023 | Huang | G06T 5/60 382/254 |

OTHER PUBLICATIONS

Xinhao Liu et al., Single-Image Noise Level Estimation for Blind Denoising, IEEE Transactions on Image Processing, vol. 22, No. 12, Dec. 2013, doi: 10.1109/TIP.2013.2283400, pp. 5226-5237.*

Florinel-Alin et al., “Diffusion Models in Vision: A Survey,” in IEEE Transactions on Pattern Analysis and Machine Intelligence, vol. 45, No. 9, pp. 10850-10869, Sep. 1, 2023, doi: 10.1109/TPAMI.2023.3261988.*

Cordts et al. “The Cityscapes Dataset” *2016 IEEE Conference on Computer Vision and Pattern Recognition* Jun. 2016 (pp. 1-4).

Isola et al. “Image-to-Image Translation with Conditional Adversarial Networks” *Proceedings of the IEEE conference on computer vision and pattern recognition*. 2017 (pp. 1125-1134).

Park et al. “Semantic Image Synthesis with Spatially-Adaptive Normalization” *Proceedings of the IEEE/CVF conference on computer vision and pattern recognition*. 2019 (pp. 2337-2346).

Ho et al. “Denoising Diffusion Probabilistic Models” *Advances in neural information processing systems* vol. 33, 2020 (pp. 1-12).

Dhariwal et al. “Diffusion Models Beat GANs on Image Synthesis” *Advances in neural information processing systems* vol. 34, 2021 (pp. 1-15).

Li et al. “Collaging Class-specific GANs for Semantic Image Synthesis” *Proceedings of the IEEE/CVF International Conference on Computer Vision*. 2021 (pp. 14418-14427).

Rombach et al. “High-Resolution Image Synthesis with Diffusion Models” *Proceedings of the IEEE/CVF conference on computer vision and pattern recognition*. 2022 (pp. 10684-10695).

Wang et al. “Semantic Image Synthesis via Diffusion Models” *arXiv preprint ariXiv2207.00050v2* Nov. 22, 2022 (pp. 1-16).

Wei et al. “Inferring and Leveraging Parts from Object Shape for Improving Semantic Image Synthesis” *Proceedings of the IEEE/CVF Conference on Computer Vision and Pattern Recognition*. 2023 (pp. 11248-11258).

* cited by examiner

METHOD AND APPARATUS WITH IMAGE PROCESSING BASED ON NEURAL DIFFUSION

CROSS-REFERENCE TO RELATED APPLICATIONS

This application claims the benefit under 35 USC § 119(a) of Korean Patent Application No. 10-2023-0125532, filed on Sep. 20, 2023, in the Korean Intellectual Property Office, the entire disclosure of which is incorporated herein by reference for all purposes.

BACKGROUND

1. Field

The following description relates to a method and apparatus with image processing based on neural diffusion.

2. Description of Related Art

A neural network model implemented by a processor as a special computing structure may generate intuitive mapping for computation between an input pattern and an output pattern after considerable training. Such a trained capability of generating the mapping may be referred to as a learning ability of the neural network model. Furthermore, a neural network model trained and specialized through special training has, for example, a generalized ability to provide a relatively accurate output with respect to an input pattern for which it has not specifically been trained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method is performed by a computing device, and the method includes: setting a randomness level for a target object; generating a noised image by performing a diffusion process of generating noise images while repeatedly performing noising based on a guide image of a guide domain including the target object and by extracting and saving, based on the randomness level, a partial preservation area from a noise image among the noise images; and obtaining a denoised output image of a target domain by performing a reverse process of repeatedly generating, based on the noised image, denoise images corresponding to the noise images and by applying the saved partial preservation area to a denoise image among the denoise images.

The noise image may be selected, from among the noise images, to have the partial region extracted therefrom, and wherein the selecting may be based on the noise image having a noise level corresponding to the randomness level of the target object.

The applying the saved partial preservation area to the denoise image may include replacing, in the denoise image, a partial replacement area corresponding to the target object with the saved partial preservation area.

The randomness level may be set based on a property of the guide image and a type of the target object.

Characteristics of the guide domain of the target object and characteristics of the target domain of the target object in the output image may be expressed in a mixture, according to the randomness level.

The higher the randomness level of the target object, the stronger are characteristics of the target domain of the target object may be expressed in the output image relative to characteristics of the guide domain of the target object.

The reverse process may be performed using a diffusion model that includes a neural network.

The diffusion model may be configured to perform the reverse process based on the noised image and based on a semantically segmented condition image.

The diffusion model may be configured to adjust intensity of application of the reverse process based on a condition coefficient.

The condition coefficient may be set based on the randomness level.

The saved partial preservation area may replace a corresponding area in the denoise image, and wherein the denoise image is selected for the partial area replacement based on the randomness level.

In another general aspect, an electronic device may include: one or more processors; and a memory storing instructions configured to cause the one or more processors to: set a randomness level for a target object; generate a noised image by performing a diffusion process of generating noise images while repeatedly performing noising based on a guide image of a guide domain including the target object and by extracting and saving, based on the randomness level, a partial preservation area from a noise image among the noise images; and obtain a denoised output image of a target domain by performing a reverse process of repeatedly generating, based on the randomness level, denoise images corresponding to the noise images and by applying the saved partial preservation area to a denoise image among the denoise images.

The instructions may be further configured to cause the one or more processors to: select the noise image from among the noise images based on the noise image having a noise level corresponding to the randomness level.

The instructions may be further configured to cause the one or more processors to: select the denoise image, from among the denoise images, for application of the saved partial preservation area, wherein he selecting is based on the denoise image having a noise level corresponding to the randomness level.

The randomness level may be set based on a property of the guide image and based on a type of the target object.

Characteristics of the guide domain of the target object and characteristics of the target domain of the target object in the output image may be expressed in a mixture, according to the randomness level.

The reverse process may be performed using a diffusion model that includes a neural network.

The diffusion model may be configured to perform the reverse process based on the noised image and based on a semantically segmented condition image.

The diffusion model may be configured to adjust intensity of application of the reverse process based on a condition coefficient, and the condition coefficient may be set based on the randomness level.

In another general aspect, a method performed by a computing device includes: providing a semantically segmented guide image having an area of a target object, the target object having a randomness level associated therewith; performing noising based on the segmented guide image to generate a final noised image, the noising including generating an intermediate noised image corresponding to the randomness level, wherein the final noised image is generated by adding noise to the intermediate noised image; extracting and saving a region of the intermediate noised image that corresponds to the area of the target object; inputting the final noised image to a diffusion model which generates, based on the final noised image, a predicted final denoised image, wherein the predicted final denoised image is generated by: (i) generating, by the diffusion model, an intermediate denoised image corresponding to the randomness level by replacing a region of the intermediate denoised image with the saved region of the intermediate noised image, and (ii) generating, by the diffusion model, the final denoised image based on the intermediate denoised image which includes the saved region of the intermediate noised image.

Other features and aspects will be apparent from the following detailed description, the drawings, and the claims.

Figure 1:
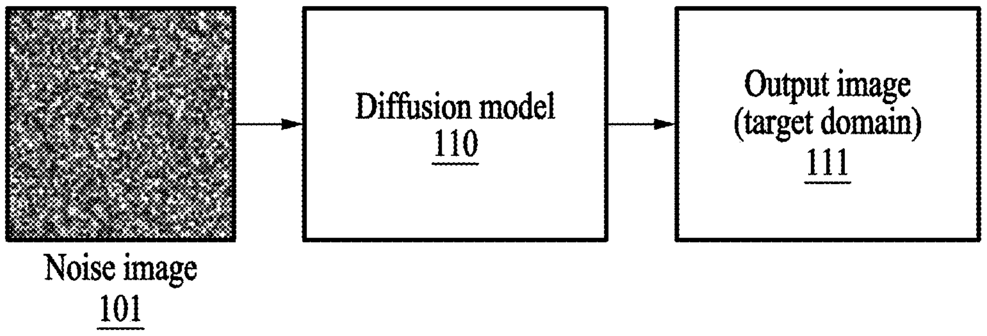
FIG. 1 illustrates an example of operation of a diffusion model, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be Interpreted In an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a diffusion model, according to one or more embodiments. Referring to FIG. 1, a diffusion model 110 may generate an output image 111 from a noise image 101. The diffusion model 110 may be or may include a neural network that has been trained to generate the output image 111 from the noise image 101. The diffusion model 110 may be referred to as a neural diffusion model or a diffusion probabilistic model. For example, the diffusion model 110 may include a convolutional layer, one or more skip connections, concatenation, attention module, etc. In some implementations, a diffusion model for reverse diffusion (denoising) may have a known neural network architecture, e.g., a U-Net based architecture, but with differences described herein.

The neural network may be trained based on deep learning to perform inference suitable for the purpose of training by mapping input data and output data that are in a nonlinear relationship. Deep learning is a machine learning technique for solving an issue such as image or speech recognition from a big data set. Deep learning may be construed as an optimization issue solving process of finding a point at which energy is minimized while training a neural network using prepared training data.

Through supervised or unsupervised learning of deep learning, a structure of the neural network or a weight corresponding of a model may be obtained (e.g., in a diffusion model with weights trained to predicts noise E at each step/layer), and the input data may be mapped to the output data by using the weight. If the width and the depth of the neural network are sufficiently great, the neural network may have a capacity sufficient to implement a predetermined function. The neural network may achieve an optimized performance when learning a sufficiently large amount of training data through an appropriate training process, e.g., by setting the weight or other parameter to minimize a loss of the neural network.

The diffusion model 110 may perform semantic image synthesis (generation of a synthetic image). A semantic image may have different values in different kinds of object areas (e.g., a first patch with pixels having a same first value representing a first type of object and a second patch with pixels having a same second value representing a second type of object). The semantic image synthesis may involve a technique of generating an image of a target domain (subject matter domain) with each object area (area of a corresponding target object) being preserved (each object area being an area of the image having some type of object, e.g., a sky area, a sign area, etc.). For example, the target domain may be a realistic image domain, such as human faces, natural scenes, and road images. Area preservation is described later.

The diffusion model 110 may be a diffusion probabilistic model. The noise image 101 may be generated by a diffusion process of repeatedly adding noise to an original image. The diffusion process (generating a noised image) may be separate from the diffusion model 110. The diffusion model 110 may generate the output image 111 by performing a reverse process of repeatedly removing noise from noise images (i.e., denoising). The diffusion process of generating a noise image may be referred to as a forward process, and the reverse process of generating an output image may be referred to as a sampling process.

The diffusion model 110 may be trained to perform the reverse process of denoising for image generation. More specifically, for training, for a set of ground truth images, for a given representative ground truth image, corresponding noise images of progressively different noise levels may be generated during the diffusion (noising) process to produce a final noise image that is paired with the given ground truth image. This may be repeated for each ground truth training image and a training set may be constructed from thus-formed final/output noise images (paired with their corresponding ground truth images). In other words, 8 as example, the diffusion process may perform noise addition operations and in a certain noise addition operation, a first image (e.g., ground truth) before the noise addition operation and a second image (noised image) after the noise addition operation may be a training pair. The second image (the noised image) may be used as a training input and the first image may be used as the ground truth (GT) for the training set. The training set may include multiple such training pairs (of original/GT and noised images) and the diffusion model 110 may be trained to perform the reverse process (denoising) based on the training set. Thus, after the training, when a noised image is inputted to the trained diffusion model 110, the diffusion model 110 predicts/infers a corresponding denoised image.

As described again below, randomness of the diffusion model 110 may be adjusted to an appropriate level based on a randomness parameter such as a guide image, a condition image, and/or a condition coefficient. Assuming that multiple objects are in an image, the randomness may be adjusted for each object in the image by setting an object-specific randomness parameter for each object. As described herein, the reverse process of denoising may be specifically adjusted for each object in the guide image based on semantic segmentation, and condition intensity may be adjusted for each object based on the condition image and/or the condition coefficient.

Figure 2:
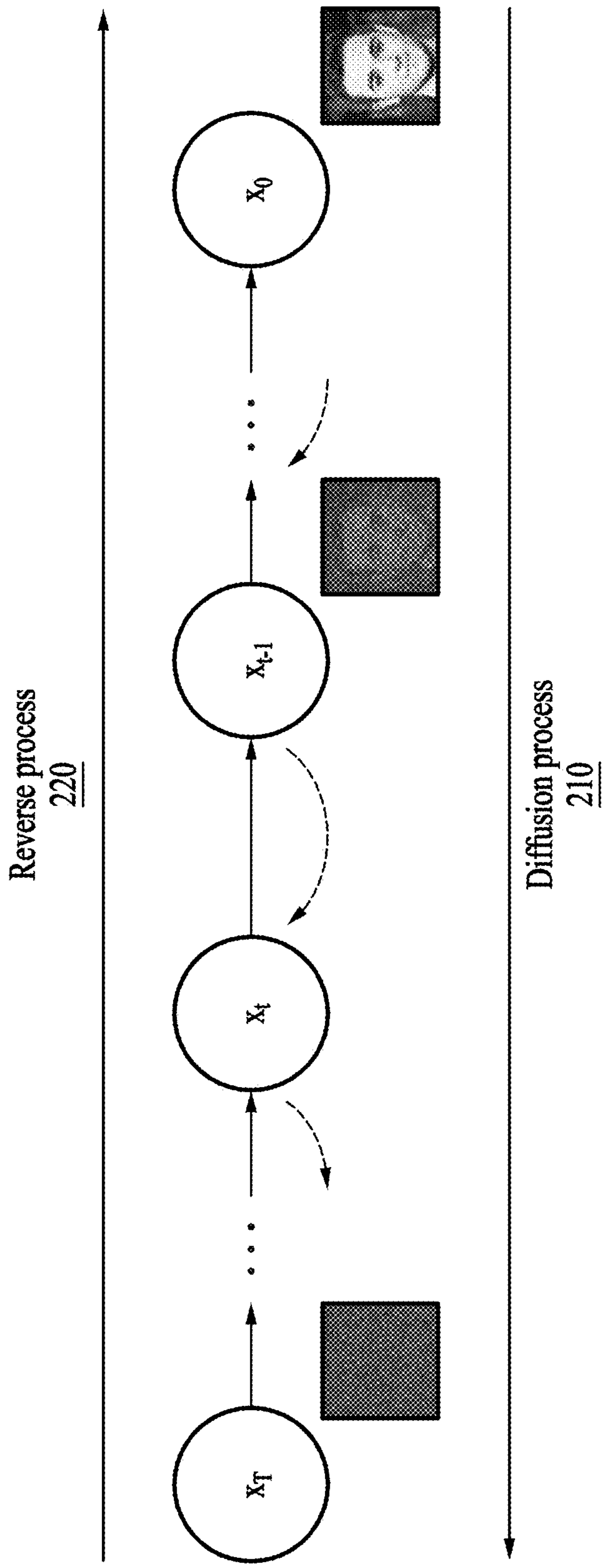
FIG. 2 illustrates an example of a diffusion process and a reverse process, according to one or more embodiments.

FIG. 2 illustrates an example of a diffusion process and a reverse process. Referring to FIG. 2, starting with an original image $x_0$, noise may be gradually added to images $x_0$ to $x_{T-1}$ through a diffusion process. The addition of noise may be referred to as noising. For example, noise may be added to an image $x_{t-1}$ to generate an image $x_t$. t may be 1 to T. At first, noise may be added to an image $x_0$ to generate an image $x_1$ and at the end, noise may be added to an image $x_{T-1}$ to generate an image $x_T$. The image $x_T$ may be referred to as a reverse input image or a reverse input version. The diffusion process may be performed based on a noise function according to which noise is added at each iteration. The amount of noise added at each increment may not be linear.

Through a reverse process, noise may be gradually removed from a noised image. The removal of noise may be referred to as denoising. For example, noise may be removed from an image $y_t$ to generate an image $y_{t-1}$. At first, noise may be removed from the image $x_T$ to generate an image $y_{T-1}$, and, at the end, noise may be removed from an image $y_1$ to generate an output image y. The image $x_t$ has an index (t) for a corresponding noising point and the image $y_t$ has an Index (t) according/corresponding to a noise level of the image $x_t$. A noising result may be referred to as a noise image and a denoising result may be referred to as a denoised image. The reverse process (denoising) may be performed based on a diffusion model.

Figure 3:
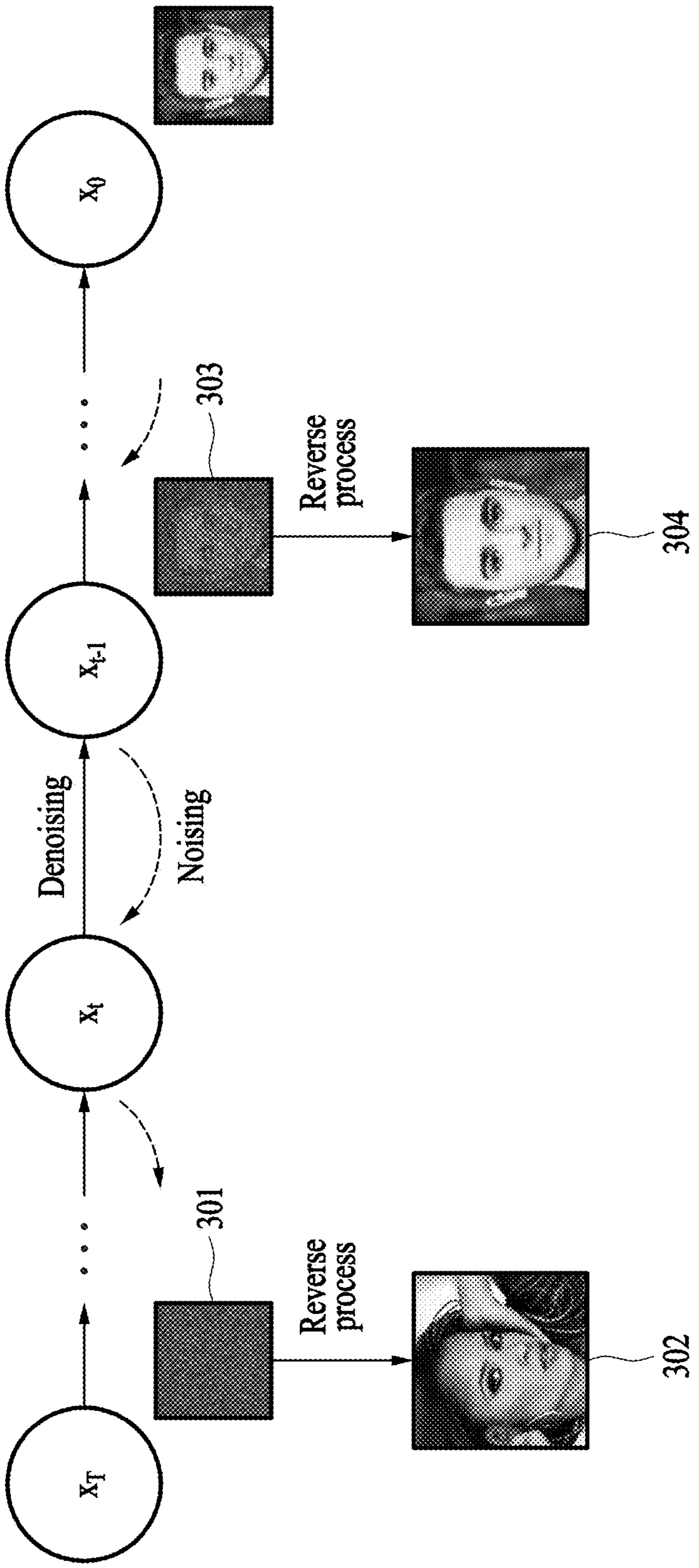
FIG. 3 illustrates an example of a relationship between a noise level of a reverse input image and an output image of a reverse process, according to one or more embodiments.

FIG. 3 illustrates an example of a relationship between a noise level of a reverse input image and an output image of a reverse process (from left to right), according to one or more embodiments. The reverse process (denoising) may be performed by a noise model (e.g., diffusion model 110). Referring to FIG. 3, a first noise image 301 and a second noise image 303 may be generated according to a diffusion process based on an original image $x_0$. The first noise image 301 may have a higher noise level than the second noise image 303. The first noise image 301 may have a noise level such that an object of the original image $x_0$ is almost unrecognizable and the second noise image 303, having been marginally denoised, may have a noise level such that the object of the original image $x_0$ is less unrecognizable than the first noise image 301.

The first noise image 301 may have higher randomness than the second noise image 303. Randomness may be contrasted with controllability. High randomness may be correlated with low controllability (here, controllability refers to ability to control the content of the intended outcome). When randomness is high, results (of the reverse process) may be highly dependent on analysis (inference) performed by the corresponding diffusion model. For example, since the first noise image 301 may have a noise level such that the object of the original image $x_0$ is almost unrecognizable, a first output image 302 with an object (e.g., a woman's face) that is different from the object (e.g., a man's face) of the original image $x_0$ may be generated according to a reverse process (denoising) of the diffusion model.

Since the second noise image 303 may have a noise level such that the object of the original image $x_0$ is slightly recognizable, a second output image 304 with the same object as the object of the original image $x_0$ may be generated according to the reverse process of the diffusion model. When a color image (e.g., a red, green, and blue (RGB) image) with predetermined color information, such as the second noise image 303, is used as a guide image, the randomness of the diffusion model may be reduced. As described again below, according to examples, such randomness control based on the noise level may be applied on an object-by-object basis for a given image (e.g., levels of randomness may differ for different respective objects of an image).

Figure 4:
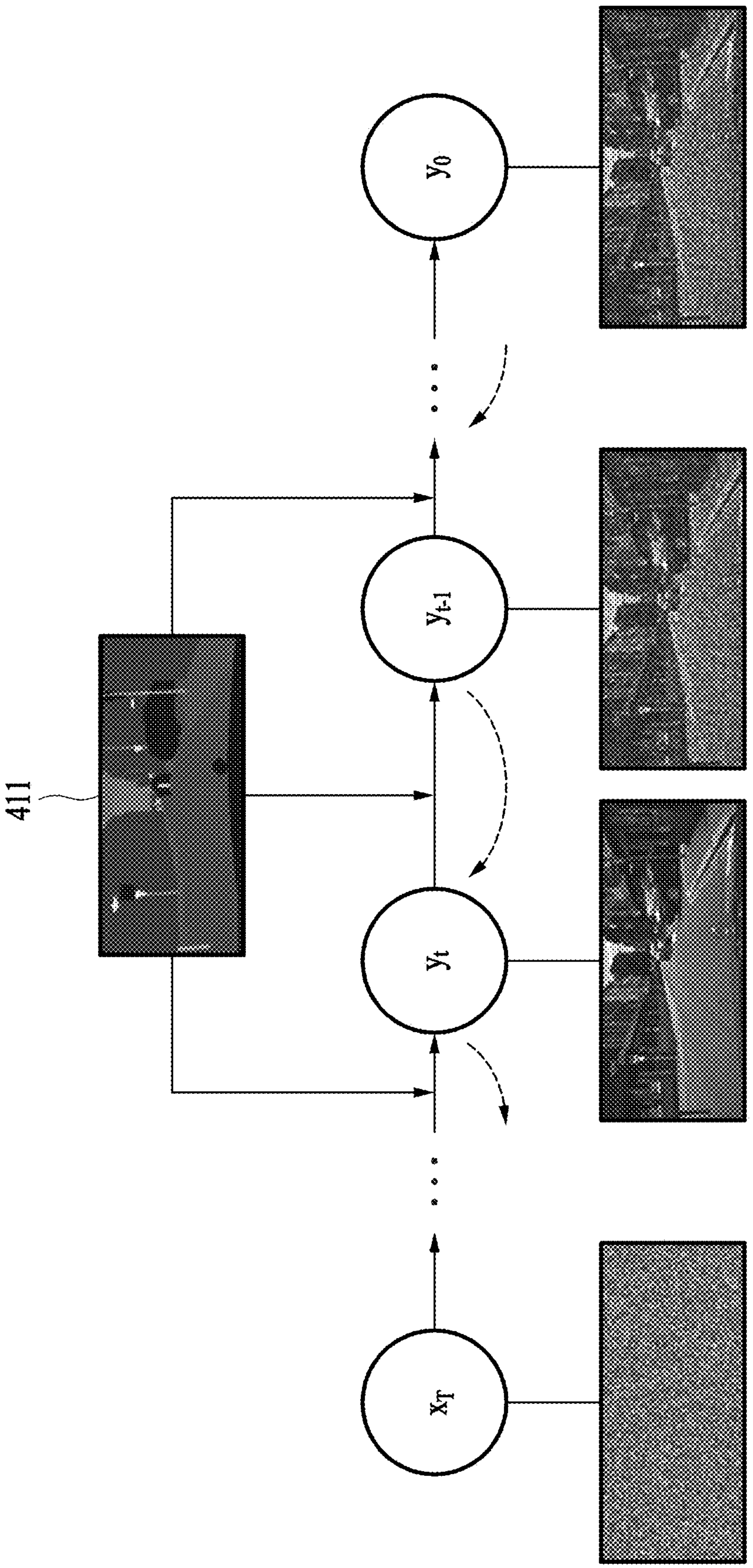
FIG. 4 illustrates an example of a diffusion model using a condition image, according to one or more embodiments.

FIG. 4 illustrates an example of a diffusion model using a condition image, according to one or more embodiments. With diffusion models, condition information, such as a condition image, may be used to direct the outcome of a denoised image inferred/predicted from a noised image. Referring to FIG. 4, a diffusion model may perform a reverse process (denoising) based on images $x_T$ and $y_t$ to $y_{t-1}$ and so forth to $y_0$ (the final denoised image) using a condition image 411. The condition image 411 may be a semantic image but is not limited thereto. When the condition image 411 is a semantic image, the diffusion model may perform denoising so that each object area of the condition image 411 may be somewhat maintained when the diffusion model is applied. The diffusion model may be trained based on the condition image 411. For example, the diffusion model may be trained to generate a denoised result image (e.g., the first/output image described with reference to FIG. 1) that has been denoised from input data combined with a noise image (e.g., the second image described with reference to FIG. 1) and the condition image 411. The combining may include concatenation. In another example, the condition image 411 may be provided in/via an attention module of the diffusion model. Randomness of the diffusion model may be selectively reduced by the condition image 411. As described again below, according to examples, such randomness control based on the condition image 411 may be applied to respective objects for object-specific randomness-level control.

Figure 5:
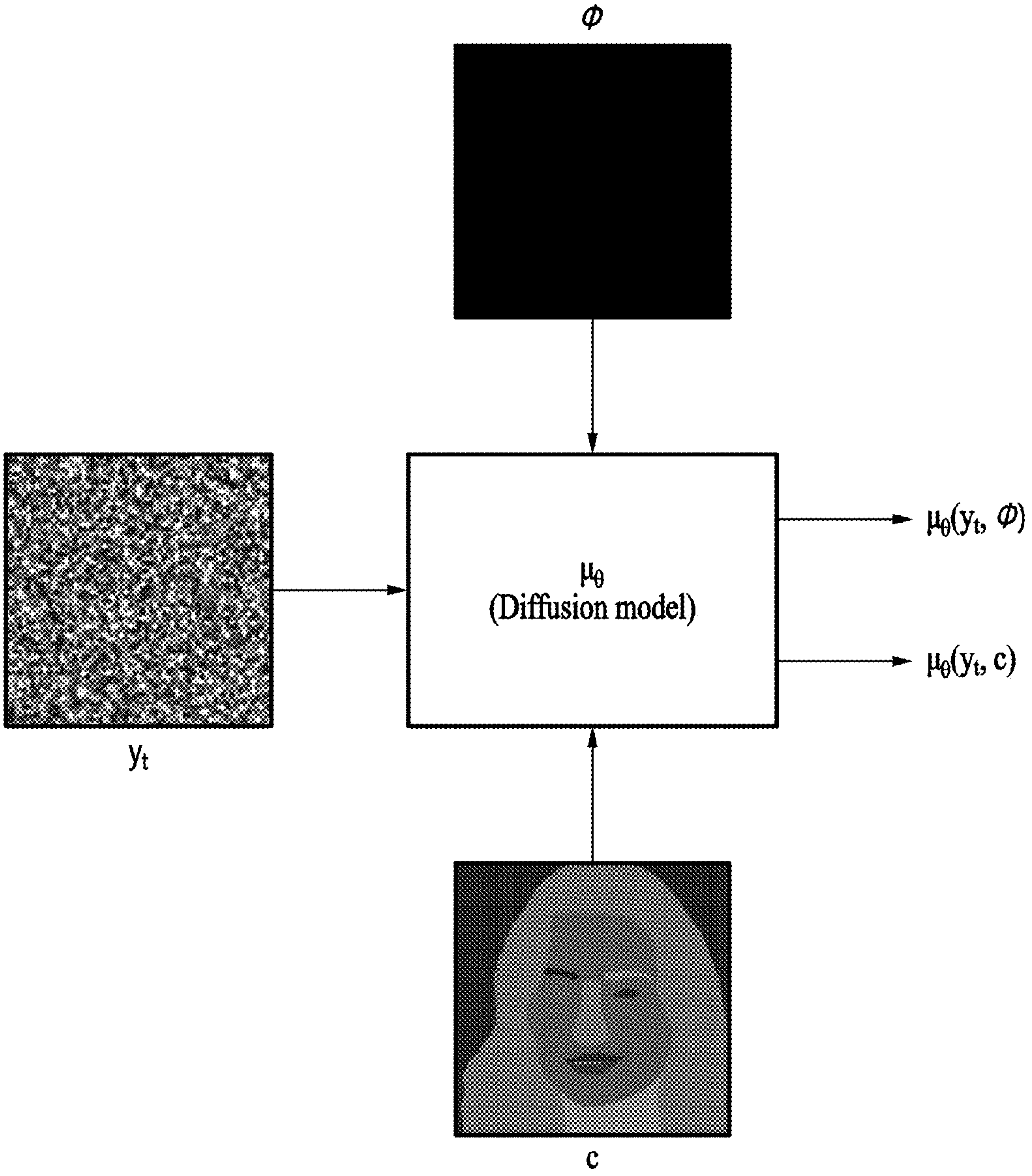
FIG. 5 illustrates an example of an application of a condition image based on a condition coefficient, according to one or more embodiments.

FIG. 5 illustrates an example of application of a condition image (c) based on a condition coefficient, according to one or more embodiments. Referring to FIG. 5, a diffusion model $\mu_\theta$ ($\theta$ representing trainable/trained weights/parameters of the model) may perform denoising on a noise image $y_t$ using the condition image c. Intensity of application of the condition image c may be adjusted based on a condition coefficient (application intensity referring to the intensity (condition coefficient) with which the condition image c is applied). The application operation of the condition image c may be expressed as in Equation 1 below.

$$\hat{\mu}_\theta(y_t) = s\mu_\theta(y_t, c) + (1-s)\mu_\theta(y_t, \phi), \quad s > 1 \qquad \text{Equation 1}$$

In Equation 1, s denotes a condition coefficient, $\mu_\theta(y_t, c)$ is a term that represents a first result image obtained by the diffusion model $\mu_\theta$ having performed denoising on a noise image $y_t$ using the condition image c, $\mu_\theta(y_t, \phi)$ is a term that represents a second result image in which the diffusion model $\mu_\theta$ has performed denoising on the noise image $y_t$ using a blank image $\phi$ together with the condition image c, and $\hat{\mu}_\theta(y_t)$ denotes a result image from combining the first result image with the second result image based on the condition coefficient s. As described again below, according to examples, such randomness control based on the condition image c and the condition coefficient s may be applied to each object.

Figure 6:
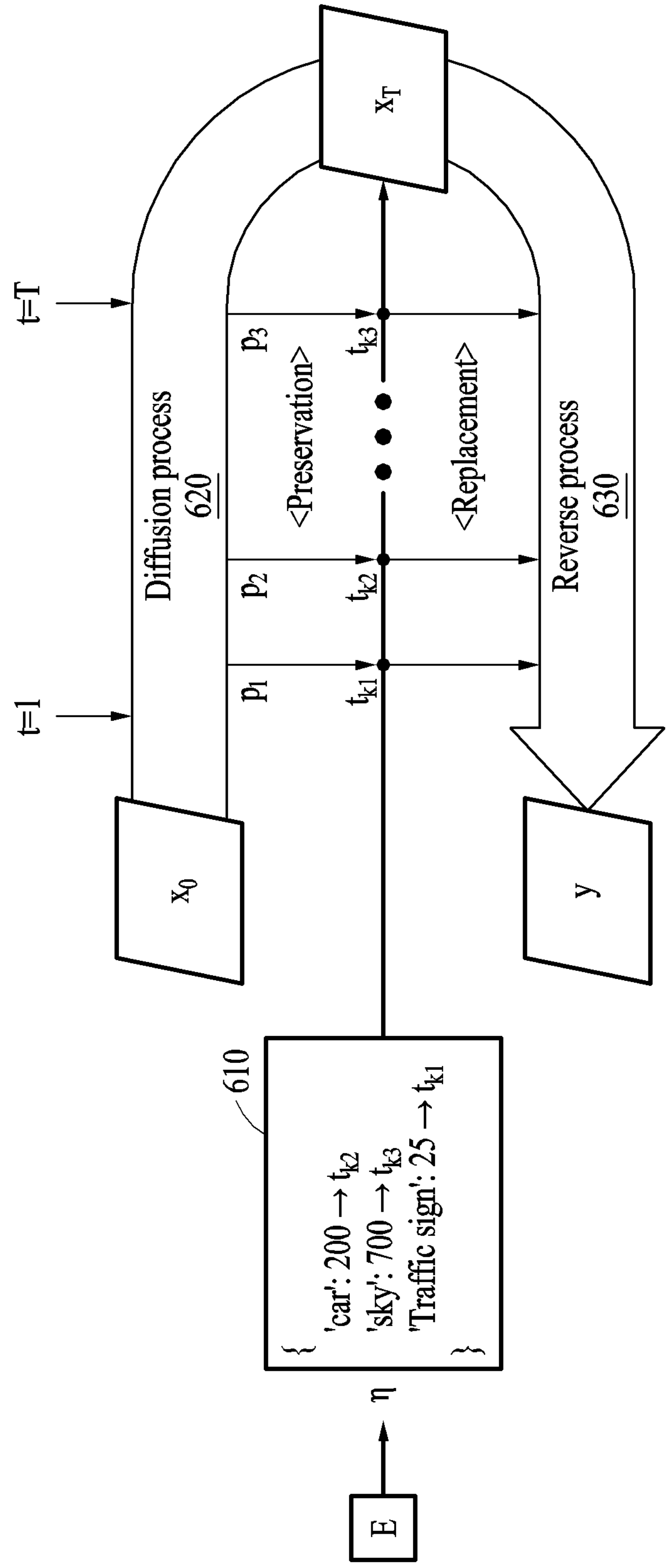
FIG. 6 illustrates an example of generating an output image from a guide image, according to one or more embodiments.

FIG. 6 illustrates an example of generating an output image (y) from a guide image ($x_0$), according to one or more embodiments. Referring to FIG. 6, a randomness level setting 610 for target objects may be determined (the level setting 610 having randomness levels specific to respective target objects). A target object may be any object that is to be subjected to object-specific randomness adjustment (description thereof follows). There may be more than one target object. For example, a vehicle, sky, and traffic sign may each be target objects with respective randomness levels. For example, the randomness level of the vehicle may be set to 200, the randomness level of the sky may be set to 700, and the randomness level of the traffic sign may be set to 25. In an example implementation, the higher the value of a randomness level the higher the amount of randomization. Each randomness level may be managed with randomness level information $\eta$.

The randomness level information $\eta$ may be generated by a dictionary model E (discussed below). The randomness level of a target object may be set based on one or more properties of a guide image $x_0$ and the type of the target object. For example, when the guide image $x_0$ has the property of being a simulation image for autonomous driving training and the target object is the sky, the randomness level of the sky may be set high. When the guide image $x_0$ is a simulation image for autonomous driving training and the target object is a traffic sign, the randomness level of the traffic sign may be set low. This is because, in autonomous driving training, the quality of the sky may not be significant for autonomous driving purposes, but the quality of a traffic sign may be significant for processing related to autonomous driving. The foregoing are non-limiting examples.

As noted, the dictionary model E may be used to set the randomness level of a target object, based on the properties of the guide image $x_0$ and the type of the target object. For example, the dictionary model E may be a neural network model. The dictionary model E may identify the target object in the guide image $x_0$ based on semantic segmentation and may set the randomness level of the target object through a pre-stored value or direct analysis (e.g., as per previous training of the dictionary model E). However, examples are not limited thereto, and the randomness level may be set in various methods by various agents. Any mechanism that is capable of mapping object types to corresponding randomness levels may be used. In addition, the basis or mechanism of setting a randomization level is not significant.

There may be multiple guide domains (subject domains that guide the denoising of a diffusion model) that may each have their own respective guide images of objects in the respective domains. The guide image $x_0$ may be an image in a guide domain that includes the target object. A diffusion model may, through denoising, convert the image in the guide domain (e.g., image $x_0$ in FIGS. 6 and 7) to an image of a target domain (e.g., image y in FIGS. 6 and 7). For example, a guide domain may be a virtual image domain, such as a simulation image. The guide image $x_0$ may be a color image (e.g., an RGB image). As generally described above, noising may be repeatedly performed using the guide image $x_0$ as an original image and accordingly, noise images may be generated. For example, T noising steps (from t=1 to t=T) may be performed and noise images $x_{t1}$ to $x_T$ may be generated.

In a diffusion process 620, partial preservation areas $p_1$, $p_2$, and $p_3$ may be extracted from respective noise images $x_{k1}$, $x_{k2}$, and $x_{k3}$ (among the noise images $x_{t1}$ to $x_T$) based on the randomness level, and, as explained next, may be saved and used during a reverse process 630/720. The partial preservation areas $p_1$, $p_2$, and $p_3$ corresponding to the respective target objects may be stored/saved from whichever of the noise images $x_{t1}$ to $x_T$ have noise levels that correspond to the randomness levels, in this example, the noise images $x_{k1}$, $x_{k2}$, and $x_{k3}$. For example, when "k1" noising steps have performed during the diffusion process, the noise level of the corresponding noise image $x_{k1}$ may correspond to the randomness level 25. In response to determining a randomness level (e.g., 25) applies to the current diffusion step (e.g., step k1), the partial preservation area $p_1$ corresponding to the traffic sign may be extracted from the noise image $x_{k1}$. When k2 noising steps are performed (diffusion step k2 is not necessarily a diffusion step immediately following the diffusion step k1), the noise level of the noise Image $x_{k2}$ may be determined to correspond to the randomness level 200, and in response the partial preservation area $p_2$ corresponding to the vehicle may be extracted from the noise image $x_{k2}$. Similarly, when the k3 noising step is performed (again, k1, k2, and k3 need not be adjacent steps), the noise level of the noise image $x_{k3}$ may be determined to correspond to the randomness level 700, and in response the partial preservation area $p_3$ corresponding to the sky may be extracted from the noise image $x_{k3}$. The partial preservation areas $p_1$, $p_2$, and $p_3$ may be extracted from the respective noise images based on semantic segmentation of the guide image (i.e., the locations and extends of the preservation areas in the noise images may be the same as in the guide image $x_0$).

In some implementations, a noised image with an arbitrary noise level may be directly calculated, by estimation, without having to compute preceding incremental noise images. In other words, a noise image for an arbitrary level of noising (e.g., j), may be directly derived. In this case, there may not necessarily be a process of determining if a current noising step matches a desired noise level of a target object, rather, noise images of the respective levels of the target objects may be directly estimated (although, in sequence with dependence on each other). In other words, for example, noise image $x_{k1}$ may be directly estimated from $x_0$ according to the k1 noise level, noise image $x_{k2}$ may be directly estimated from noise image $x_{k1}$ according to the k2 noise level, noise image $x_{k3}$ may directly estimated from $x_{k2}$ according to the k3 noise level, and the final noise image $x_T$ may directly estimated from the $x_{k3}$ noise image.

When the diffusion process 620 is completed and noise image $x_T$ has been generated, the reverse process 630 may be performed. The reverse process 630 may be performed using a diffusion model (e.g., diffusion model 110). The diffusion model may generate denoised images $y_{T-1}$ to $y_0$ while repeatedly performing denoising based on a reverse input version (e.g., the noise image $x_T$) of the noise images $x_{t1}$ to $x_T$. Denoise steps corresponding to the number of noising steps (e.g., "T") may be performed. The denoise image $y_0$ may be the output image y.

The saved partial preservation areas $p_1$, $p_2$, and $p_3$ may be applied to denoise images $y_{k1}$, $y_{k2}$, and $y_{k3}$ among the denoise images $y_{T-1}$ to $y_0$. (there may be other denoised images between any of the denoised images $y_{k1}$, $y_{k2}$, and $y_{k3}$). Partial replacement areas $r_1$, $r_2$, and $r_3$ corresponding to the target objects (and having the same respective image-locations and extents) may be replaced by the partial preservation areas $p_1$, $p_2$, and $p_3$ saved from the denoise images $y_{k1}$, $y_{k2}$, and $y_{k3}$ (among the denoise images $y_{T-1}$ to $y_0$); such denoise images having noise levels respectively corresponding to the randomness levels. For example, when the T-k3 denoising step is performed, the noise level of the denoise image $y_{k3}$ may be determined to correspond to the randomness level 700, and in response, the partial replacement area $r_3$ corresponding to the sky from the denoise image $y_{k3}$ may be replaced (overwritten) by the saved partial preservation area $p_3$. When the T-k2 denoising step is performed, the noise level of the denoise image $y_{k2}$ may be determined to correspond to the randomness level 200, and in response the partial replacement area $r_2$ corresponding to the vehicle from the denoise image $x_{k2}$ may be displaced (overwritten) by the partial preservation area $p_2$. When the T-k1 denoising step is performed, the noise level of the denoise image $y_{k1}$ may be determined to correspond to the randomness level 700, and in response, the partial replacement area $r_1$ corresponding to the traffic sign from the denoise image $x_{k1}$ may be displaced (overwritten) by the saved partial preservation area $p_1$. The partial replacement areas $r_1$, $r_2$, and $r_3$ may be determined based on the previous semantic segmentation.

Figure 7:
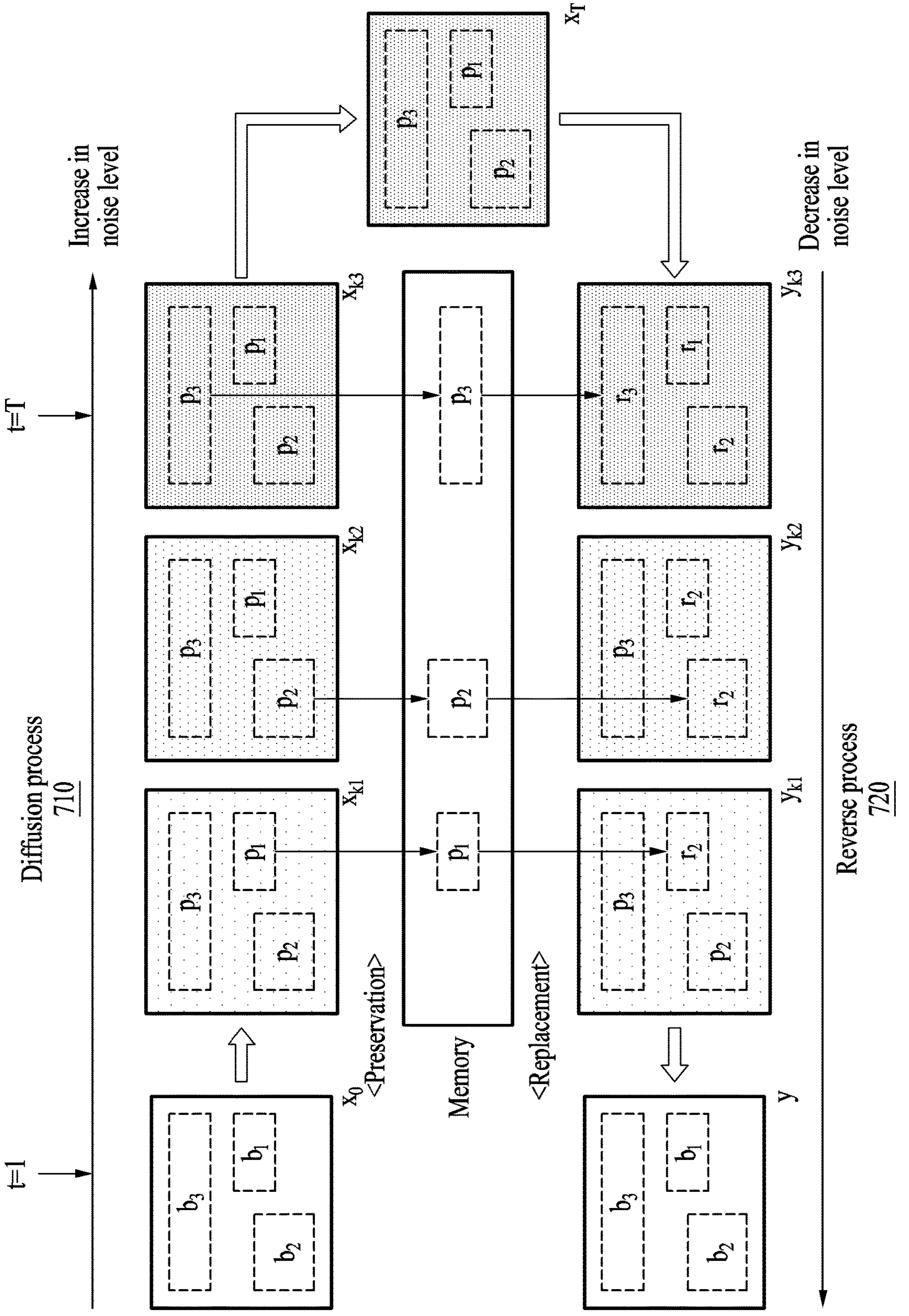
FIG. 7 illustrates an example of processing partial preservation areas and partial replacement areas, according to one or more embodiments.

FIG. 7 illustrates an example of processing partial preservation areas and partial replacement areas, according to one or more embodiments. Referring to FIG. 7, the guide image $x_0$ may include target object areas $b_1$, $b_2$, and $b_3$. Noising may be repeatedly performed using the guide image $x_0$ as an original image and accordingly, noise images $x_{t1}$ to $x_T$ may be generated during a diffusion process 710. During the diffusion process 710, the partial preservation areas $p_1$, $p_2$, and $p_3$ may be extracted from the noise images $x_{k1}$, $x_{k2}$, and $x_{k3}$ among the noise images $x_{t1}$ to $x_T$ based on the randomness levels of the respective target objects (of the respective target object areas $b_1$, $b_2$, and $b_3$). The partial preservation areas $p_1$, $p_2$, and $p_3$ corresponding to target objects may be copied from the noise images $x_{k1}$, $x_{k2}$, and $x_{k3}$ having noise levels corresponding to the randomness levels, among the noise images $x_{t1}$ to $x_T$, and stored in a memory.

When the diffusion process 710 is completed, the reverse process 720 may be performed. The diffusion model may generate the denoise images $y_{T-1}$ to $y_0$ while repeatedly performing denoising based on a reverse input version (e.g., the noise image $x_T$) of the noise images $x_{t1}$ to $x_T$. The saved partial preservation areas $p_1$, $p_2$, and $p_3$ may be applied to denoise images $y_{k1}$, $y_{k2}$, and $y_{k3}$ among the denoise images $y_{T-1}$ to $y_0$. The partial replacement areas $r_1$, $r_2$, and $r_3$ corresponding to the target objects may be replaced by the partial preservation areas $p_1$, $p_2$, and $p_3$ from the denoise images $y_{k1}$, $y_{k2}$, and $y_{k3}$ having noise levels respectively corresponding to the randomness levels, among the denoise images $y_{T-1}$ to $y_0$.

When noise level-based control needs to be applied to an entire image, it may be difficult to obtain a desired effect. Individual noise adjustment for each target object according to examples may not be limited to such a restriction. Accordingly, characteristics of a guide domain of the target object and characteristics of a target domain of the target object may be expressed in a combination, according to the randomness level, in the target object areas $b_1$, $b_2$, and $b_3$ of the output image y of the target domain. The higher the randomness level of the target object, the stronger the characteristics of the target domain of the target object may be expressed in the output image y and the less the characteristics of the guide domain of the target object may be expressed.

For example, when the diffusion model has been trained on a realistic image domain as the target domain, an object area (e.g., the sky) with a high randomness level may have strong characteristics of the target domain corresponding to the realistic image, and an object area (e.g., the traffic sign) with a low randomness level may have strong characteristics of the guide domain corresponding to a simulation image. For example, when training images for autonomous driving are generated with such a diffusion model, traffic signs and vehicles, which are important information for training, may be expressed as information given in the simulation image, and the sky, which is not important information for training, may be expressed in a state close to the realistic image. However, examples are not limited thereto, and examples may be applied to various situations that require domain switching.

Figure 8:
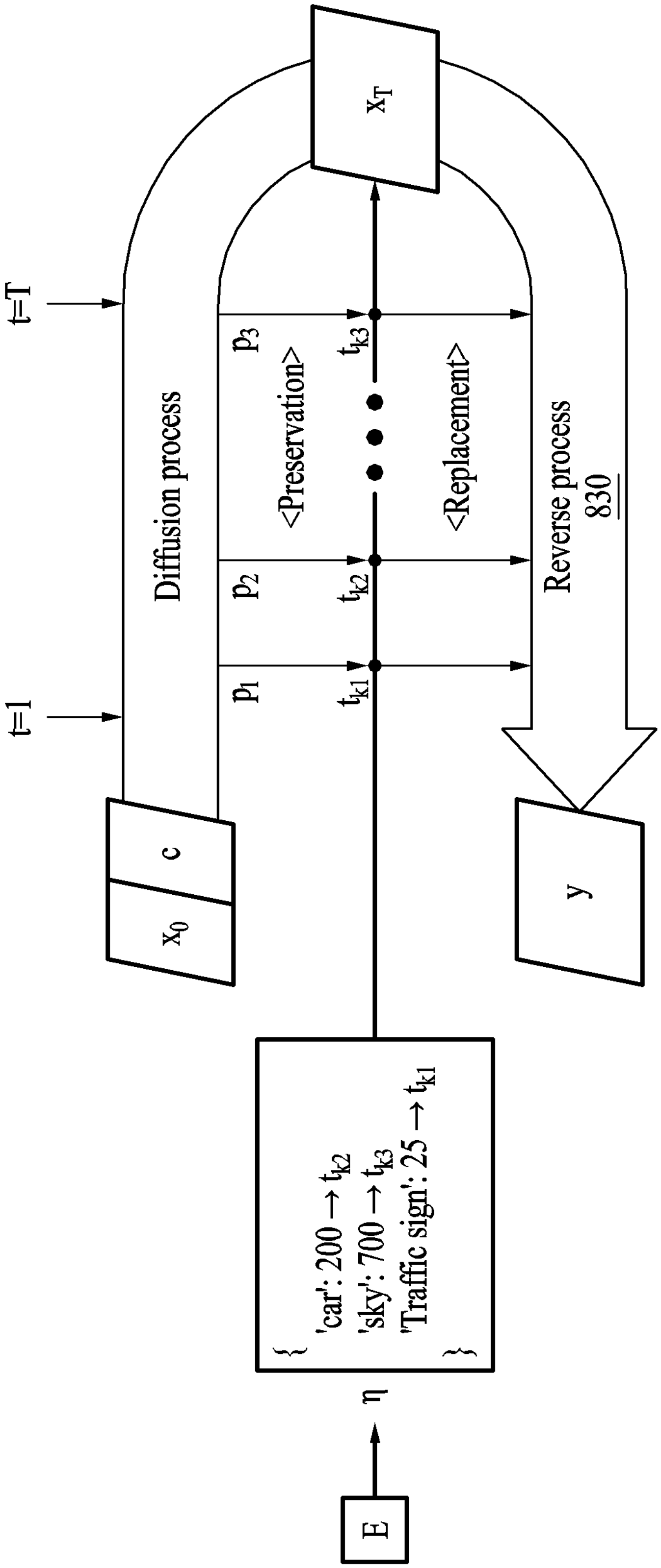
FIG. 8 illustrates an example of generating an output image from a guide image and a condition image, according to one or more embodiments.

FIG. 8 illustrates an example of generating an output image from a guide image and a condition image, according to one or more embodiments. Referring to FIG. 8, unlike the example in FIG. 6, a condition image c that is semantically segmented may be additionally used. A diffusion model may perform a reverse process 830, based on a reverse input version (e.g., the noise image $x_T$) and the condition image c. As described with reference to FIG. 4 above, the condition image c may limit randomness of the diffusion model. For example, the guide image $x_0$ may be a road simulation image and the condition image c may be a semantically segmented image that separates lanes, driveways, and sidewalks from each other. In this case, the condition image c may limit the randomness of the diffusion model to separate lanes, driveways, and sidewalks when performing the reverse process 830. In addition, the description provided with reference to FIGS. 1 to 7 may generally apply to the example of FIG. 8.

Figure 9:
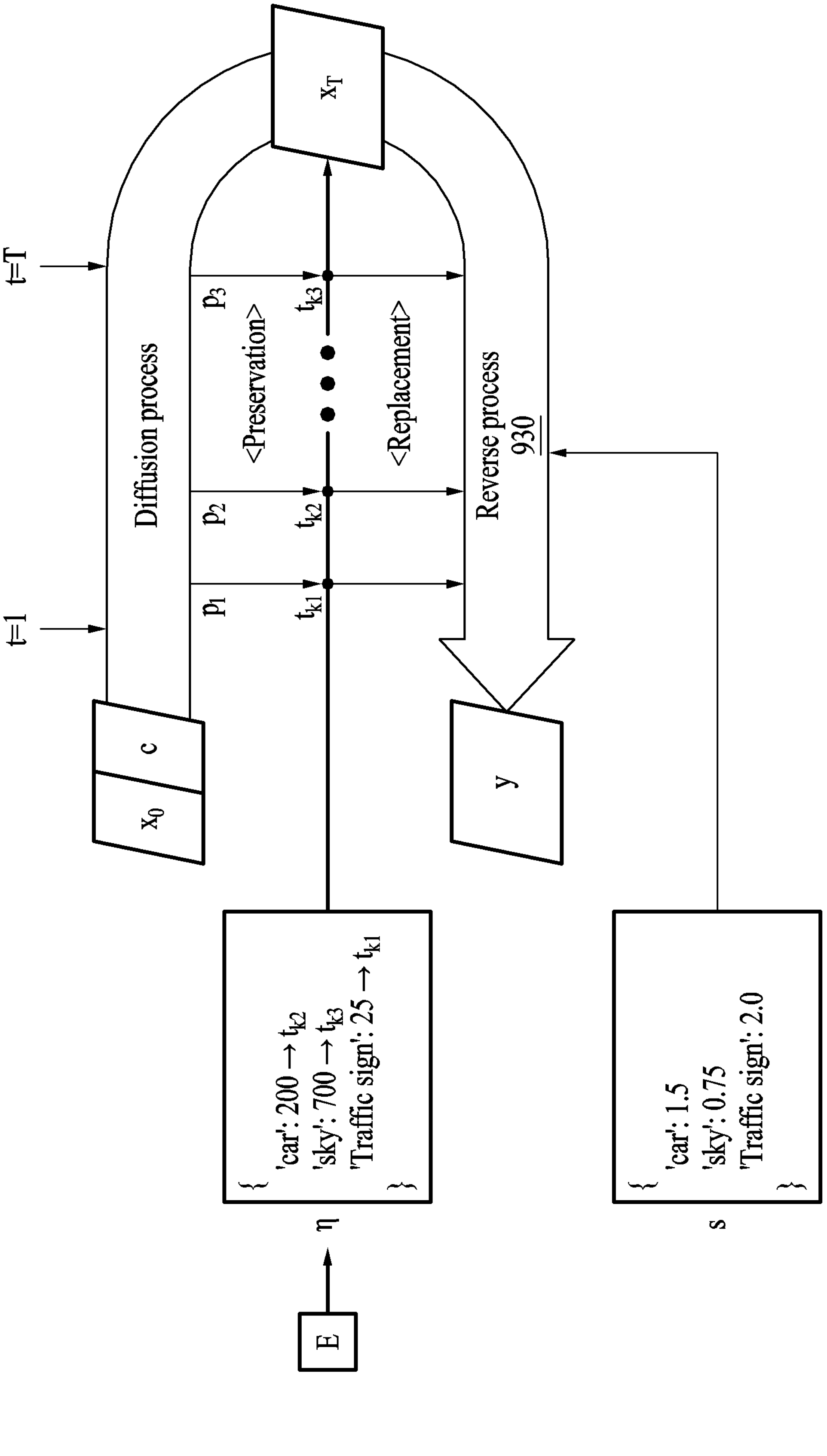
FIG. 9 illustrates an example of generating an output image from a guide image, a condition image, and a condition coefficient, according to one or more embodiments.

FIG. 9 illustrates an example of generating an output image from a guide image, a condition image, and a condition coefficient, according to one or more embodiments. Referring to FIG. 9, unlike the examples in FIGS. 6 and 7, the condition image c, which is semantically segmented, and the condition coefficient s may be used. The condition coefficient s may include coefficient values of target objects. For example, the condition coefficient s may include coefficient values of 1.5, 0.75, and 2.0 for a vehicle, sky, and traffic sign, respectively.

A diffusion model may adjust application intensity for a reverse process 930 of the condition image c based on the condition coefficient s. The higher the condition coefficient s of a target object (and corresponding segment/area), the lower the randomness of the target object. The condition coefficient s may be set based on the randomness level. The condition coefficient s may be set to be inversely proportional to the randomness level. A target object with a high randomness level may be given a low condition value and a target object with a low randomness level may be given a high condition value.

Since the condition image c corresponds to a semantic image, the randomness of an object area of each target object may be controlled individually based on the condition coefficient s. When the condition coefficient s needs to be adjusted throughout the image, it may be difficult to obtain a desired effect. In contrast, individual adjustment for each target object according to examples may not be limited to such a restriction.

Figure 10:
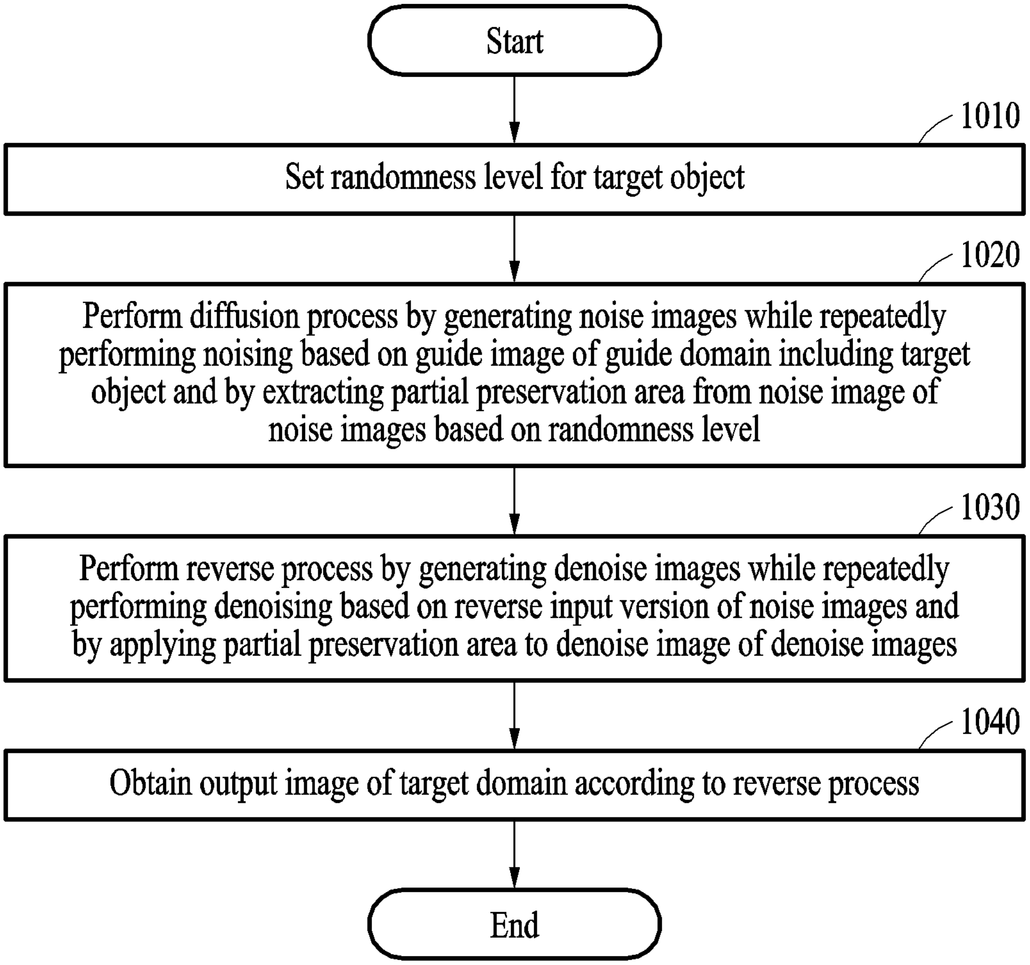
FIG. 10 illustrates an example of an image processing method based on neural diffusion, according to one or more embodiments.

FIG. 10 illustrates an example of an image processing method based on neural diffusion, according to one or more embodiments. Referring to FIG. 10, an electronic device is configured to, in operation 1010, set a randomness level for a target object, in operation 1020, perform a diffusion process by generating noise images by repeatedly performing noising based on a guide image of a guide domain including the target object and by extracting a partial preservation area from one of the noise images based on the randomness level, in operation 1030, perform a reverse process by generating denoise images while repeatedly performing denoising based on a reverse input version of the noise images and by applying the partial preservation area to a denoise image of the denoise images, and in operation 1040, obtain an output image of a target domain according to the reverse (denoising) process.

Operation 1020 may include storing the partial preservation area corresponding to the target object from the noise image having a noise level corresponding to the randomness level, among the noise images.

Operation 1030 may include replacing a partial replacement area corresponding to the target object as the partial preservation area from the denoise image having a noise level corresponding to the randomness level, among the denoise images.

The randomness level may be set based on the properties of the guide image and the type of the target object.

Characteristics of the guide domain of the target object and characteristics of the target domain of the target object are expressed in a mixture, according to the randomness level in the output image.

The higher the randomness level of the target object, the stronger the characteristics of the target domain of the target object may be expressed in the output image than the characteristics of the guide domain of the target object.

The reverse process may be performed using a diffusion model based on a neural network.

The diffusion model may perform the reverse process based on the reverse input version and a condition image segmented semantically.

The diffusion model may adjust application intensity for the reverse process of the condition image segmented semantically based on a condition coefficient.

The condition coefficient may be set based on the randomness level.

In addition, the description provided with reference to FIGS. 1 to 9 and 11 may apply to the image processing method of FIG. 10.

Figure 11:
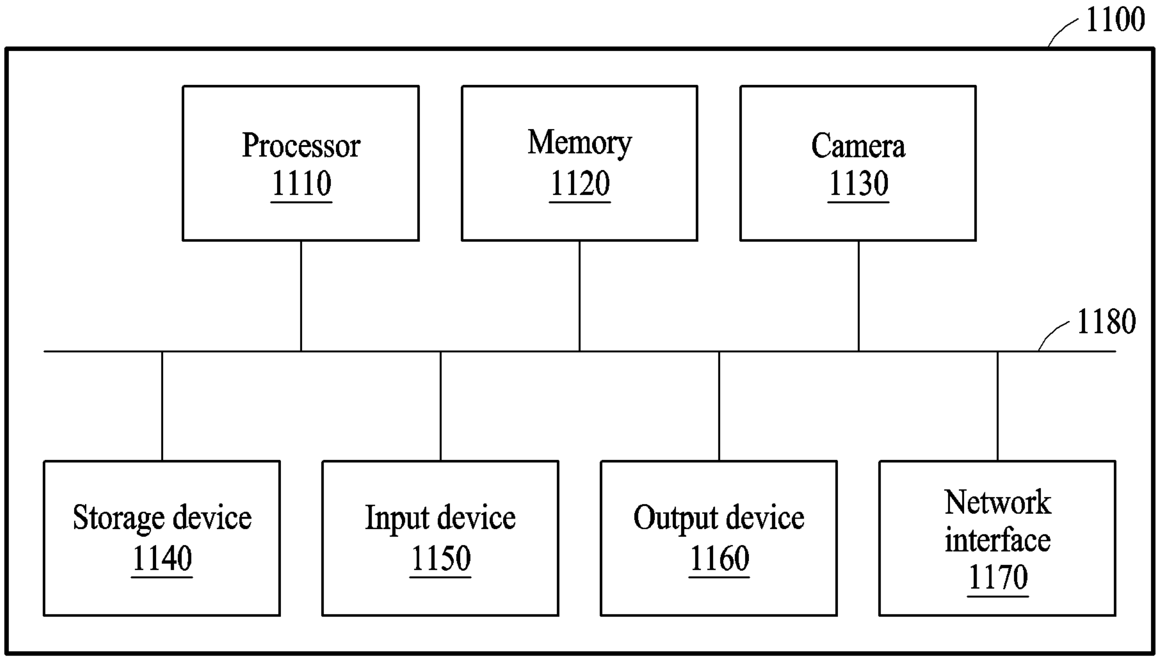
FIG. 11 illustrates an example electronic device, according to one or more embodiments.

FIG. 11 illustrates an example configuration of an electronic device, according to one or more embodiments. Referring to FIG. 11, an electronic device 1100 may include a processor 1110, a memory 1120, a camera 1130, a storage device 1140, an input device 1150, an output device 1160, and a network interface 1170 that may communicate with each other through a communication bus 1180. For example, the electronic device 1100 may be implemented as at least a part of a mobile device such as a mobile phone, a smartphone, a personal digital assistant (PDA), a netbook, a tablet computer or a laptop computer, a wearable device such as a smart watch, a smart band, or smart glasses, a computing device such as a desktop or a server, a home appliance such as a television, a smart television, or a refrigerator, a security device such as a door lock, or a vehicle such as an autonomous vehicle or a smart vehicle.

The processor 1110 executes instructions or functions to be executed by the electronic device 1100. The processor 1110 may, in practice, be one of, or any combination of, any of a variety of types of processors (examples are described below). For example, the processor 1110 may process the instructions stored in the memory 1120 or the storage device 1140. The processor 1110 may perform the operations described with reference to FIGS. 1 to 10. For example, the processor 1110 may be configured to set a randomness level for a target object, perform a diffusion process by generating noise images while repeatedly performing noising based on a guide image of a guide domain including the target object and by extracting a partial preservation area from a noise image of the noise images based on the randomness level, perform a reverse process by generating denoise images while repeatedly performing denoising based on a reverse input version of the noise images and by applying the partial preservation area to a denoise image of the denoise images, and obtain an output image of a target domain according to the reverse process.

The memory 1120 may include a computer-readable storage medium or a computer-readable storage device. The memory 1120 may store instructions to be executed by the processor 1110 and may store related information while software and/or an application is being executed by the electronic device 1100.

The camera 1130 may capture a photo and/or an image. The storage device 1140 may include a computer-readable storage medium or computer-readable storage device. The storage device 1140 may store more information than the memory 1120 for a long time. For example, the storage device 1140 may include a magnetic hard disk, an optical disc, flash memory, a floppy disk, or other non-volatile memories known in the art.

The input device 1150 may receive an input from the user in traditional input manners through a keyboard and a mouse, and in new input manners such as a touch input, a voice input, and an image input. For example, the input device 1150 may include a keyboard, a mouse, a touch screen, a microphone, or any other device that detects the input from the user and transmits the detected input to the electronic device 1100. The output device 1160 may provide an output of the electronic device 1100 to the user through a visual, auditory, or haptic channel. The output device 1160 may include, for example, a display, a touch screen, a speaker, a vibration generator, or any other device that provides the output to the user. The network interface 1170 may communicate with an external device through a wired or wireless network.

The examples described herein may be implemented using a hardware component, a software component and/or a combination thereof. A processing device may be implemented using one or more general-purpose or special-purpose computers, such as, for example, a processor, a controller, and an arithmetic logic unit (ALU), a digital signal processor (DSP), a microcomputer, a field-programmable gate array FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media (not a signal per se) including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The computing apparatuses, the electronic devices, the processors, the memories, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media.

Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An image processing method performed by a computing device, the method comprising:
setting a randomness level for a target object;
generating a noised image by performing a diffusion process of generating noise images while repeatedly performing noising based on a guide image of a guide domain including the target object and by extracting and saving, based on the randomness level, a partial preservation area from a noise image among the noise images; and
obtaining a denoised output image of a target domain by performing a reverse process of repeatedly generating, based on the noised image, denoise images corresponding to the noise images and by applying the saved partial preservation area to a denoise image among the denoise images.

2. The image processing method of claim 1, wherein the noise image is selected, from among the noise images, to have the partial region extracted therefrom, and wherein the selecting is based on the noise image having a noise level corresponding to the randomness level of the target object.

3. The image processing method of claim 1, wherein the applying the saved partial preservation area to the denoise image comprises replacing, in the denoise image, a partial replacement area corresponding to the target object with the saved partial preservation area.

4. The image processing method of claim 1, wherein
the randomness level is set based on a property of the guide image and a type of the target object.

5. The image processing method of claim 1, wherein
characteristics of the guide domain of the target object and characteristics of the target domain of the target object in the output image are expressed in a mixture, according to the randomness level.

6. The image processing method of claim 1, wherein
the higher the randomness level of the target object, the stronger are characteristics of the target domain of the target object are expressed in the output image relative to characteristics of the guide domain of the target object.

7. The image processing method of claim 1, wherein
the reverse process is performed using a diffusion model that comprises a neural network.

8. The image processing method of claim 7, wherein
the diffusion model is configured to perform the reverse process based on the noised image and based on a semantically segmented condition image.

9. The image processing method of claim 8, wherein
the diffusion model is configured to adjust intensity of application of the reverse process based on a condition coefficient.

10. The image processing method of claim 9, wherein
the condition coefficient is set based on the randomness level.

11. The image processing method of claim 1, wherein the saved partial preservation area replaces a corresponding area in the denoise image, and wherein the denoise image is selected for the partial area replacement based on the randomness level.

12. An electronic device comprising:
one or more processors; and
a memory storing instructions configured to cause the one or more processors to:
set a randomness level for a target object;
generate a noised image by performing a diffusion process of generating noise images while repeatedly performing noising based on a guide image of a guide domain including the target object and by extracting and saving, based on the randomness level, a partial preservation area from a noise image among the noise images; and
obtain a denoised output image of a target domain by performing a reverse process of repeatedly generating, based on the randomness level, denoise images corresponding to the noise images and by applying the saved partial preservation area to a denoise image among the denoise images.

13. The electronic device of claim 12, wherein the instructions are further configured to cause the one or more processors to:
select the noise image from among the noise images based on the noise image having a noise level corresponding to the randomness level.

14. The electronic device of claim 12, wherein the instructions are further configured to cause the one or more processors to:
select the denoise image, from among the denoise images, for application of the saved partial preservation area, wherein he selecting is based on the denoise image having a noise level corresponding to the randomness level.

15. The electronic device of claim 12, wherein
the randomness level is set based on a property of the guide image and based on a type of the target object.

16. The electronic device of claim 12, wherein
characteristics of the guide domain of the target object and characteristics of the target domain of the target object in the output image are expressed in a mixture, according to the randomness level.

17. The electronic device of claim 12, wherein
the reverse process is performed using a diffusion model that comprises a neural network.

18. The electronic device of claim 17, wherein
the diffusion model is configured to perform the reverse process based on the noised image and based on a semantically segmented condition image.

19. The electronic device of claim 18, wherein
the diffusion model is configured to adjust intensity of application of the reverse process based on a condition coefficient, and
wherein the condition coefficient is set based on the randomness level.

20. A method performed by a computing device, the method comprising:
providing a semantically segmented guide image having an area of a target object, the target object having a randomness level associated therewith;
performing noising based on the segmented guide image to generate a final noised image, the noising comprising generating an intermediate noised image corresponding to the randomness level, wherein the final noised image is generated by adding noise to the intermediate noised image;
extracting and saving a region of the intermediate noised image that corresponds to the area of the target object;
inputting the final noised image to a diffusion model which generates, based on the final noised image, a predicted final denoised image, wherein the predicted final denoised image is generated by:
generating, by the diffusion model, an intermediate denoised image corresponding to the randomness level by replacing a region of the intermediate denoised image with the saved region of the intermediate noised image; and generating, by the diffusion model, the final denoised image based on the intermediate denoised image which includes the saved region of the intermediate noised image.

* * * * *